United States Patent

[11] 3,603,560

| [72] | Inventors | Samuel E. Merrill;<br>Joseph D. Krosoczka, both of Worcester, Mass. |
|---|---|---|
| [21] | Appl. No. | 877,549 |
| [22] | Filed | Nov. 3, 1969 |
| [45] | Patented | Sept. 7, 1971 |
| [73] | Assignee | Sem-Tec, Inc.<br>Worcester, Mass.<br>Division of Ser. No. 664,426, Aug. 30, 1967, Pat. No. 3,518,742. |

[54] IMPROVED CAVITY WALL VALVE BALLS
18 Claims, 9 Drawing Figs.

| [52] | U.S. Cl. | 251/309 |
| [51] | Int. Cl. | F16k 5/06 |
| [50] | Field of Search | 251/309, 315; 29/157.1 |

[56] References Cited

UNITED STATES PATENTS

| 2,663,538 | 12/1953 | Bacchi | 251/315 X |
| 2,979,071 | 4/1961 | Herring et al. | 251/315 X |
| 3,013,766 | 12/1961 | Dawson | 251/172 X |
| 3,208,718 | 9/1965 | White | 251/315 X |
| 3,246,873 | 4/1966 | Johnson | 251/315 X |

FOREIGN PATENTS

| 406,660 | 2/1934 | Great Britain | 251/309 |
| 1,022,012 | 3/1966 | Great Britain | 251/315 |
| 1,172,335 | 10/1958 | France | 251/315 |

*Primary Examiner*—M. Cary Nelson
*Assistant Examiner*—Michael O. Sturm
*Attorney*—Stevens, Davis, Miller & Mosher

ABSTRACT: A valve ball with a cavity therein, formed by casting two semispherical shell-type segments, each having a tubular section therethrough, and bonding the semispherical segments together.

INVENTORS
SAMUEL E. MERRILL,
JOSEPH D. KROSOCZKA

BY
ATTORNEYS

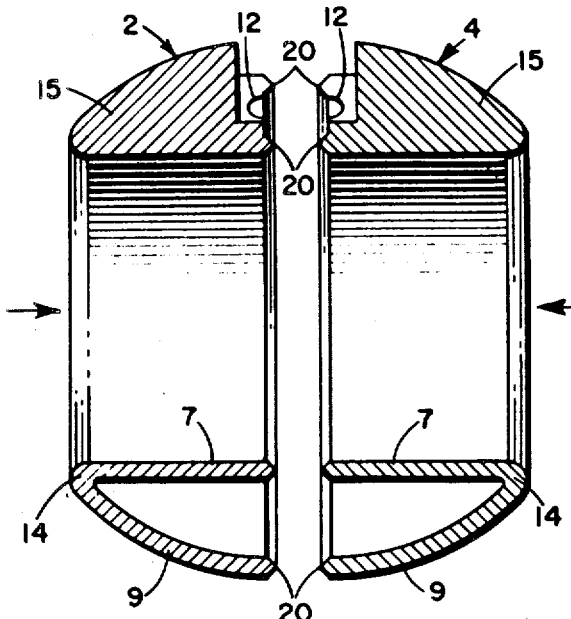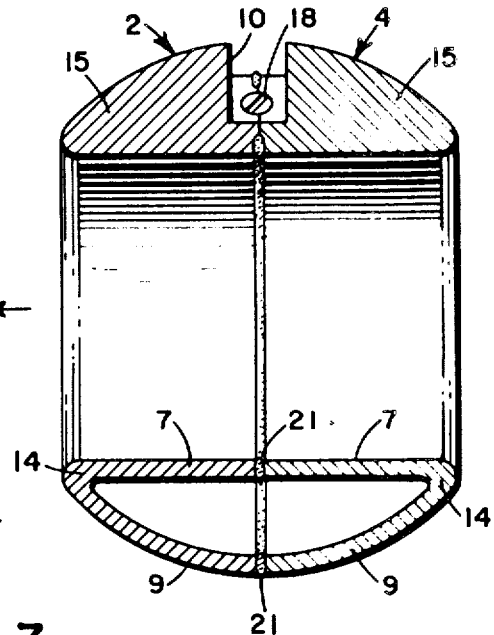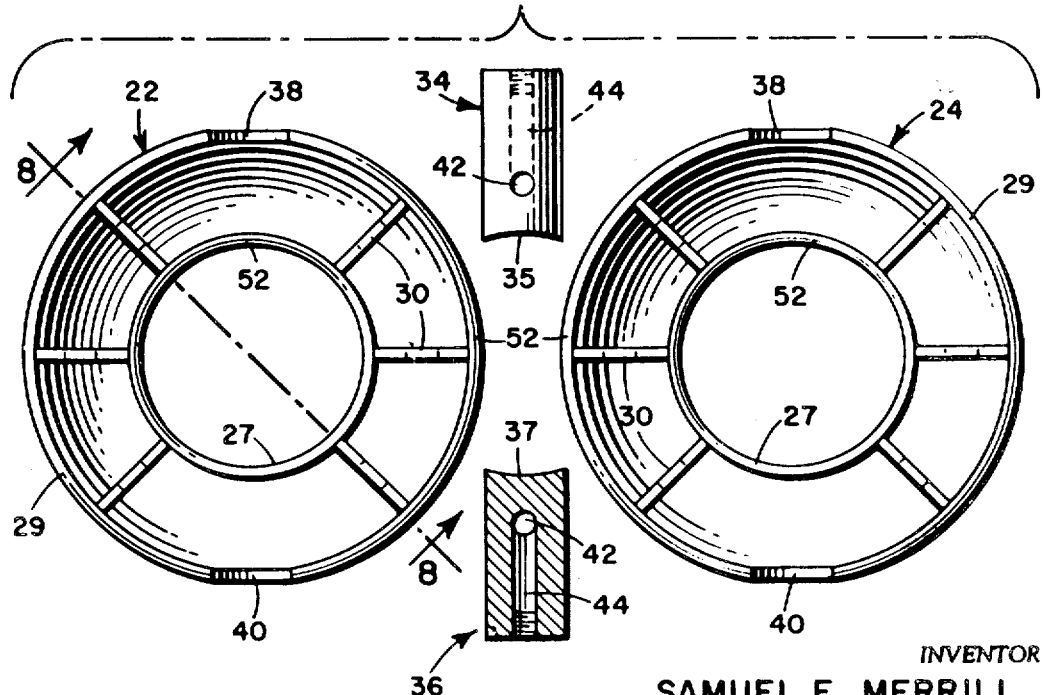

INVENTORS
SAMUEL E. MERRILL,
JOSEPH D. KROSOCZKA

BY *Stevens, Davis, Miller & Mosher*
ATTORNEYS

IMPROVED CAVITY WALL VALVE BALLS

The present application is a division of our copending application Ser. no. 664,426 filed Aug. 30, 1967, now U.S. Pat. No. 3,518,742.

BACKGROUND OF THE INVENTION

1. Field of the Invention

The present invention relates to valve balls of the type used in valve bodies as gates, and more particularly, to valve balls of this type having a cavity formed therein and a method of manufacturing them.

2. Prior Art

Many valves, especially those in high-pressure systems, employ a valve ball as a gate. A valve ball consists of a spherical segment having a tubular hole therethrough and a key slot therein. In a normal open valve operation, the tubular hole serves as a conduit and a key is provided in the valve engaging the key slot to position the ball to an open or closed position.

A disadvantage in employing these balls in the past has been that prior to the present invention, the balls were machined from a solid piece of material, normally metal, which not only required the utilization of a substantial amount of material, but due to the weight of the material used, the application of these valves was limited to instances where weight was not critical.

Another significant disadvantage was the high shipping costs inherent in shipping valves of the prior art due to their weight.

SUMMARY OF THE INVENTION

Lightweight valve balls having a passage extending therethrough and at least one cavity formed therein, formed by casting two semispherical segments each of which is provided with a tubular section therethrough, bonding the segments together, and machining the balls formed to desired dimensions.

An object of the present invention is to provide a ball for use as a gate in a valve device wherein said ball is formed with a cavity therein resulting in a saving of material and a much lighter ball than has been heretofore available.

It is also an object of the present invention to provide a method for effectively and efficiently manufacturing cavity valve balls.

It is a further object of the present invention to provide means for venting the cavity of the valve ball being formed while the two semispherical segments are being joined together.

It is still another object of the present invention to form cavity wall valve balls from two complementary semispherical segments which are provided with projections on their engaging surfaces to effect welding of the segments together.

It is still a further object of the present invention to provide a ball for use as a gate valve device and having an inner tubular member, an outer shell member spaced from the inner tubular member, a plurality of webs connecting said members, and a pair of journals extending outwardly from the outer shell member.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope.

FIG. 5 is a sectional view of two semispherical segments forming another embodiment of the present invention, before assembly of the segments;

FIG. 6 is a sectional view of the two semispherical segments of FIG. 2 after they have been bonded together;

FIG. 7 is an exploded view of a further embodiment of the present invention showing a pair of semispherical segments in plan view along with a pair of plugs, one of which is shown in section and the other in elevation;

PREFERRED EMBODIMENTS OF THE INVENTION

Figure 1:
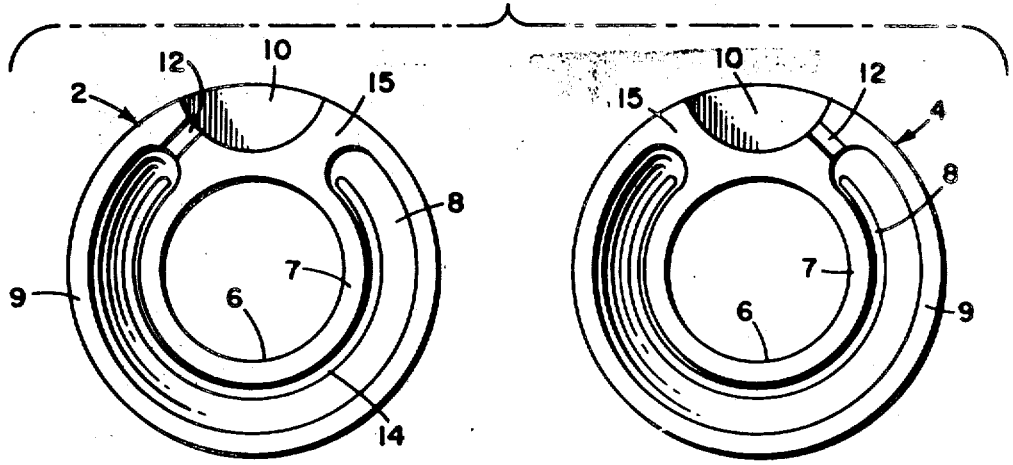
FIG. 1 is a plan view of two semispherical segments cast in accordance with the present invention.

Referring to the drawings and especially to the embodiments of FIGS. 1–4, the reference numerals 2 and 4 refer to two substantially semispherical segments which are cast or molded from any type of material such as carbon steel, stainless type steel, brass, bronze, aluminum, plastic, cast glass, ceramic, or resin reinforced fiberglass. Each of the semispherical segments has a tubular hole 6 formed therethrough.

A deep notch or cavity 8 is formed in each of segments 2 and 4 and extends for a distance of approximately 270°, a solid portion 15 making up the remaining 90°. A substantially tubular member 7 and outer shell member 9 extend for the above-mentioned 270° and join to form a wall 14. A key slot 10 is formed in the solid portion 15 of each of the segments and communicates with the cavity 8 by means of a detent 12.

In manufacture, after the free ends of tubular member 7 and outer shell 9, along with the unslotted portions of the solid portions 15, have been machined in order to provide clean joining surfaces, these surfaces are positioned in an abutting relationship with respect to the opposite faces of a wafer 16 of silver solder or other brazing media interposed between them. As shown, wafer 16 has openings formed therein at the intersection of holes 6 and cavities 8.

The segments are then maintained in their relative positions and placed in an atmospheric furnace where they are heated to a temperature of 900° F.–1,750° F., depending upon the melting point of the material making up the wafer.

After the wafer 16 is brought to its melting point, the fixture and the segments are removed from the atmospheric furnace and allowed to cool slowly under normal atmospheric conditions, permitting the bonding or brazing media to firmly join the two segments into a ball of spherical shape with a tubular hole passing through its axis.

Figure 2:
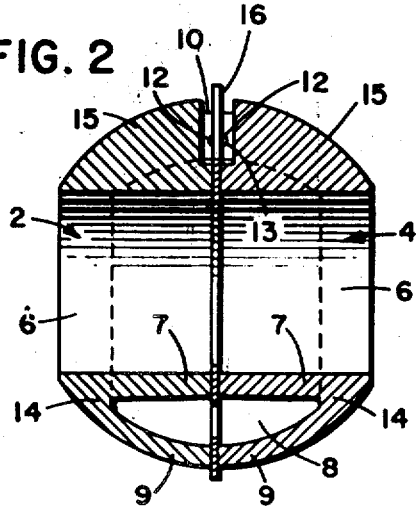
FIG. 2 is a sectional view of the two semispherical segments of FIG. 1 positioned with a wafer of bonding material interposed between them.
Figure 3:
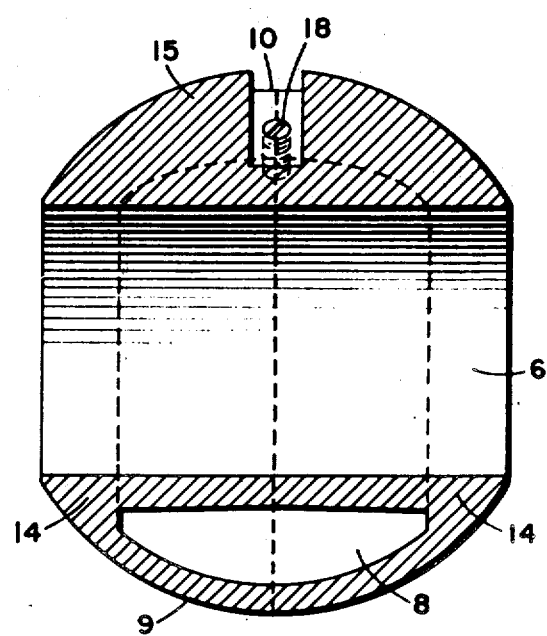
FIG. 3 is a sectional view of the two semispherical segments of FIG. 2 bonded together with a screw sealing the cavity vent.

As shown in FIG. 2, the detents 12 of the segments 2 and 4 form a vent 13 for the cavity 8, while the segments are being subjected to heat and being bonded together.

After the two segments 2 and 4 are firmly joined together, the vent 13 formed by the detents 12 in the segments 2 and 4 is tapped forming threads, and a screw 18 is dipped in a screw lock resin such as LOCKTITE or the like, and is then screwed into engagement with the threads closing and sealing the vent 13 and locking itself therein.

Figure 4:
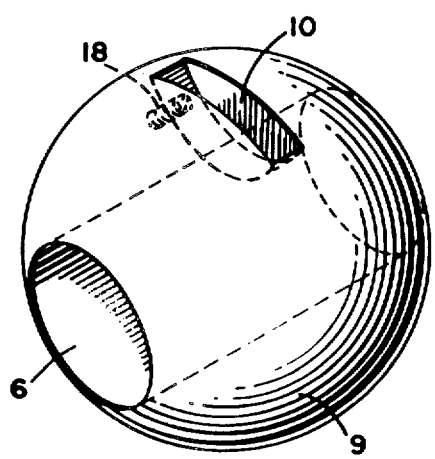
FIG. 4 is a perspective view illustrating a finished cavity wall valve ball in accordance with the present invention.

As shown in FIG. 4, the screw 18 becomes an integral part of the key slot 10 and is machined as an integral part thereof.

The substantially spherical ball thus formed by the two segments including the screw 18 is then machined to desired dimensions by conventional machine shop methods.

The embodiment shown in FIGS. 5 and 6 is substantially similar to the previous embodiment, and therefore, the same reference numerals are used for corresponding structure. However, this embodiment eliminates the use of a wafer or the like in assembling the two segments 2 and 4, but instead has a plurality of tapered projections 20 extending from the facing surfaces of solid portion 15, tubular members 7, and outer shell members 9 of the respective segments.

Therefore, in assembly, the corresponding projections 20 on each of the segments 2 and 4 are brought into engagement and are melted by high-pressure welding or the like, the heat being vented through the vent formed by detents 12. The assembled segments are shown in FIG. 6 in the form of a sphere, the numeral 21 referring to the melted material. Of course, the vent formed by detents 12 may then be tapped and screw 18 inserted therein, as described in the previous embodiment.

The assembled sphere is then machined to the desired dimensions by any conventional machine shop methods.

Figure 8:
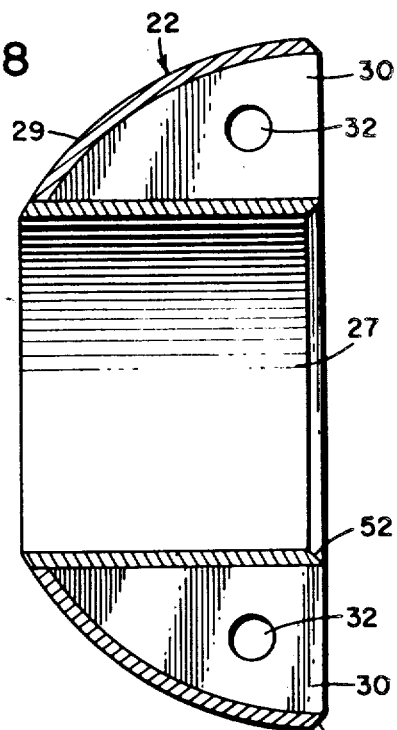
FIG. 8 is a sectional view taken along line 8—8 of FIG. 7.
Figure 9:
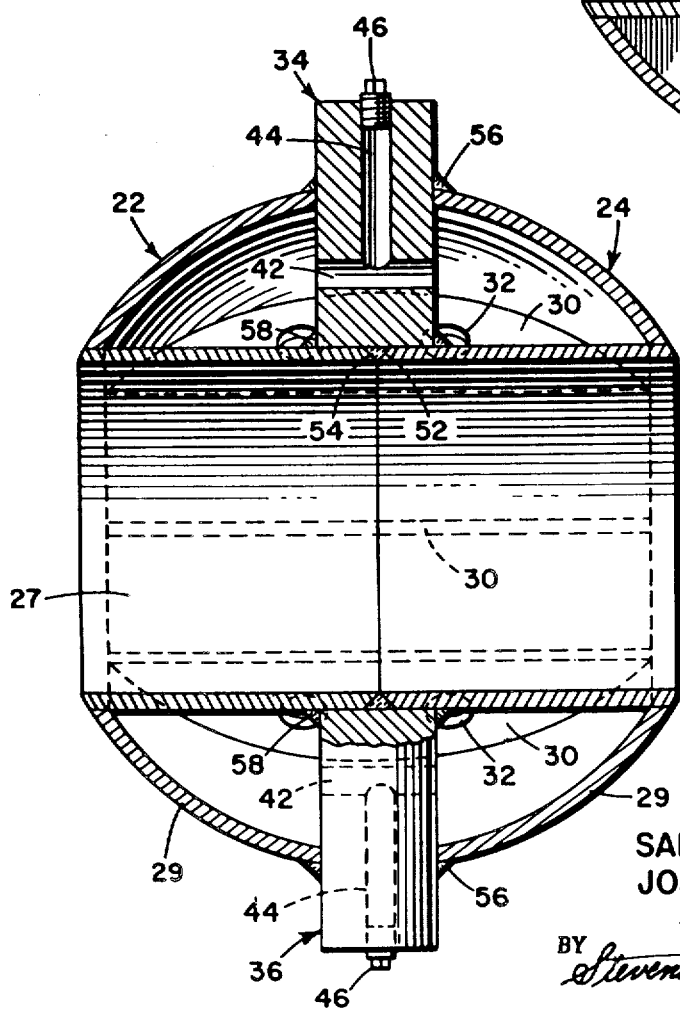
FIG. 9 is a sectional view of the parts shown in FIG. 7 after they have been assembled, taken along the axis of rotation of the formed sphere.

FIGS. 7–9 depict a further embodiment of the present invention. As shown, two substantially semispherical segments 22 and 24 are provided, each of which has an inner tubular member 27, an outer shell member 29, and a plurality of radially extending supporting webs 30 connecting the outer surface of inner tubular member 27 to the inner surface of shell member 29. Each of webs 30 has an aperture 32 extending therethrough for venting purposes, as will be described in detail later.

A pair of plugs 34 and 36 are also provided which extend through a pair of cooperating notches 38 and a pair of cooperating notches 40, respectively, provided in segments 22 and 24. One end of each of plugs 34 and 36 is curved, as indicated at 35 and 37 respectively, to conform to the outer surface of the inner tubular members 27, and the other end of each of the plugs extends outwardly from their respective shell members when the components are assembled as shown in FIG. 9.

Each plug is provided with a transversely extending passage 42 as seen in FIGS. 7 and 9, which extends at right angles to an axially extending hole 44 intersecting passage 42 and threaded at its outer end to accommodate a screw plug 46.

In manufacture, the semispherical segments 22 and 24 are machined as necessary to provide clean joining surfaces and, together with plug members 34 and 36 are assembled by positioning the segments in contact with each other as shown in FIG. 9; inserting the plug members 34 and 36 into the spaces defined by the cooperating notches 38 and 40, respectively; and welding the cooperating beveled edges 52 of tubular members 27 and shell members 29 together as shown at 54, and the adjacent outer surfaces of plugs 34 and 36 to shell members 29 and tubular members 27 as shown at 56 and 58, respectively.

During welding the heat and gases accumulated will vent to atmosphere through apertures 32, passages 42 and holes 44. Screws 46 may then be assembled into holes 44 as described earlier.

The portions of plugs 34 and 36 which extend outwardly from the shell members 29 thus provide two journals which can be machined as desired to provide means to turn the formed valve ball 90° to open or close the valve.

In each of the valve balls above described, the cavity formed between the outer spherical shell and the tubular member may be filled with an appropriate coolant if desired.

Of course, other variations of the specific construction and arrangement of this type device herein disclosed can be made by those skilled in the art without departing from the invention as defined in the appended claims.

We claim:

1. A valve ball comprising a pair of complementary truncated semispherical segments, each having an outer shell member with a tubular section extending therethrough, and means defining a cavity extending between said tubular section and said outer shell member, the surfaces defining the large end of each of said segments being joined together so that their respective cavities register.

2. A valve ball of claim 1, further comprising a solid portion formed in each of said segments between said tubular section and said outer shell and defining a key slot when said segments are joined.

3. The valve ball of claim 2, wherein each of said cavities is of a substantially arcuate shape.

4. The valve ball of claim 2, wherein a detent is formed in each of said solid portions, said detents connecting said cavity to said key slot thus providing a vent for the cavity while the segments are being joined together.

5. The valve ball of claim 4, further comprising a screw extending into said vent to seal it.

6. The valve ball of claim 1, wherein said surfaces defining the large end of each of said segments are flat.

7. The valve ball of claim 1, wherein said surfaces defining the large end of each of said segments are in the form of tapered projections adapted to melt during high pressure welding to join said segments together.

8. The valve ball of claim 1, further comprising a plurality of webs connecting said tubular members and said outer shell members.

9. The valve ball of claim 8, wherein cooperating notches are formed in said outer shell members and further comprising at least one plug member extending into said notches and being joined to said shell members and tubular members, said webs and said plugs having vent means extending therethrough to provide a vent for the cavity while said segments and plugs are being joined.

10. The valve ball of claim 9, wherein there are two plug members provided, a portion of each of which extends outwardly from diametrically opposite portions of said outer shell members, said portions of said plug members forming journals.

11. The valve ball of claim 9, further comprising a screw extending through a portion of said vent means to seal same.

12. A valve ball comprising a substantially cylindrical body portion having a passage extending therethrough, and an outer truncated substantially spherical shell spaced from said body portion to define a cavity extending therebetween, said cavity being substantially arcuate shaped, a portion of said body portion being substantially arcuate shaped and defining a key slot, and a vent in said body portion which connects said cavity to said key slot.

13. The valve ball of claim 12, wherein said cavity is substantially cylindrical shaped.

14. The valve ball of claim 13, further comprising a plurality of apertured webs connecting said outer shell and said body position.

15. The valve ball of claim 12, further comprising at least one plug member extending through said outer shell and to said body portion, said plug member being provided with vent passages extending therethrough.

16. The valve ball of claim 15, further comprising a screw extending into one of said vent passages to seal same.

17. The valve ball of claim 15, wherein there are two plug members provided, a portion of each of which extends outwardly from diametrically opposite portions of said outer shell, said portions of said plug members forming journals.

18. The valve ball of claim 12, further comprising two journals extending outwardly from diametrically opposite portions of said outer shell.